(12) United States Patent
Sebata et al.

(10) Patent No.: US 7,028,953 B2
(45) Date of Patent: Apr. 18, 2006

(54) TWO-SIDED DEPLOYABLE THERMAL RADIATOR SYSTEM AND METHOD

(75) Inventors: Susan Sebata, Fremont, CA (US); Lenny Low, Hillsborough, CA (US)

(73) Assignee: Space Systems/Loral, Palo Alto, CA (US)

( * ) Notice: Subject to any disclaimer, the term of this patent is extended or adjusted under 35 U.S.C. 154(b) by 891 days.

(21) Appl. No.: 10/007,256

(22) Filed: Nov. 11, 2001

(65) Prior Publication Data

US 2005/0211850 A1  Sep. 29, 2005

(51) Int. Cl.
*B64G 1/50* (2006.01)

(52) U.S. Cl. ........................................ 244/163
(58) Field of Classification Search ............. 244/163, 244/158 A, 158 R
See application file for complete search history.

(56) References Cited

U.S. PATENT DOCUMENTS

| | | | |
|---|---|---|---|
| 3,548,930 A | * | 12/1970 | Byrd |
| 3,749,156 A | * | 7/1973 | Fletcher et al. |
| 4,880,050 A | * | 11/1989 | Nakamura et al. |
| 5,027,892 A | * | 7/1991 | Bannon et al. |
| 5,117,901 A | * | 6/1992 | Cullimore |
| 5,755,406 A | * | 5/1998 | Aston et al. |
| 5,787,969 A | * | 8/1998 | Drolen et al. |
| 5,794,890 A | * | 8/1998 | Jones et al. |
| 5,806,800 A | * | 9/1998 | Caplin |
| 5,806,803 A | * | 9/1998 | Watts |
| 6,003,817 A | * | 12/1999 | Basuthakur et al. |

\* cited by examiner

*Primary Examiner*—Tien Dinh
(74) *Attorney, Agent, or Firm*—Anthony W. Karambelas

(57) ABSTRACT

A spacecraft heat dissipation method, and a spacecraft having an improved thermal radiator system that uses two-sided deployable thermal radiators that dissipates heat from both front and back surfaces thereof. The use of the two-sided deployable thermal radiators enables the thermal radiator system to have approximately 50% more heat dissipating capability than a system with just one surface exposed to dissipate heat. The spacecraft includes a body, one or more solar arrays, and the present radiator system which comprises opposite facing fixed payload radiators that are thermally coupled to selected ones of the deployable radiators by way of heat pipes. In an exemplary method a spacecraft is configured to have a body, one or more solar arrays opposite facing fixed payload radiators, and one or more two-sided deployable radiators selectively coupled to the fixed payload radiators. The spacecraft is launched into orbit. When in orbit, heat coupled to the opposite facing fixed payload radiators is transferred to the two-sided deployable radiators for radiation into space from both sides thereof.

3 Claims, 3 Drawing Sheets

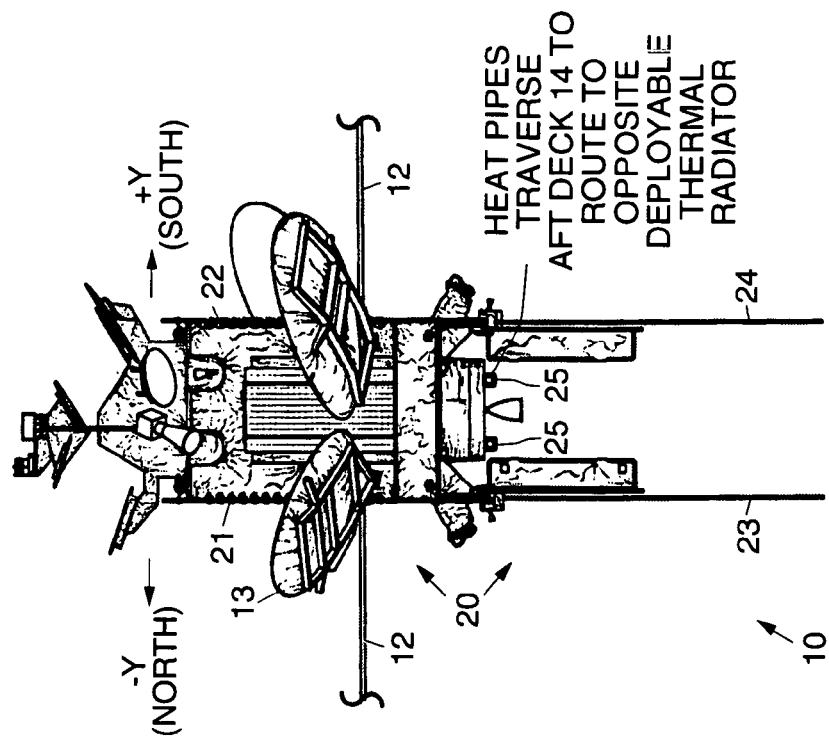
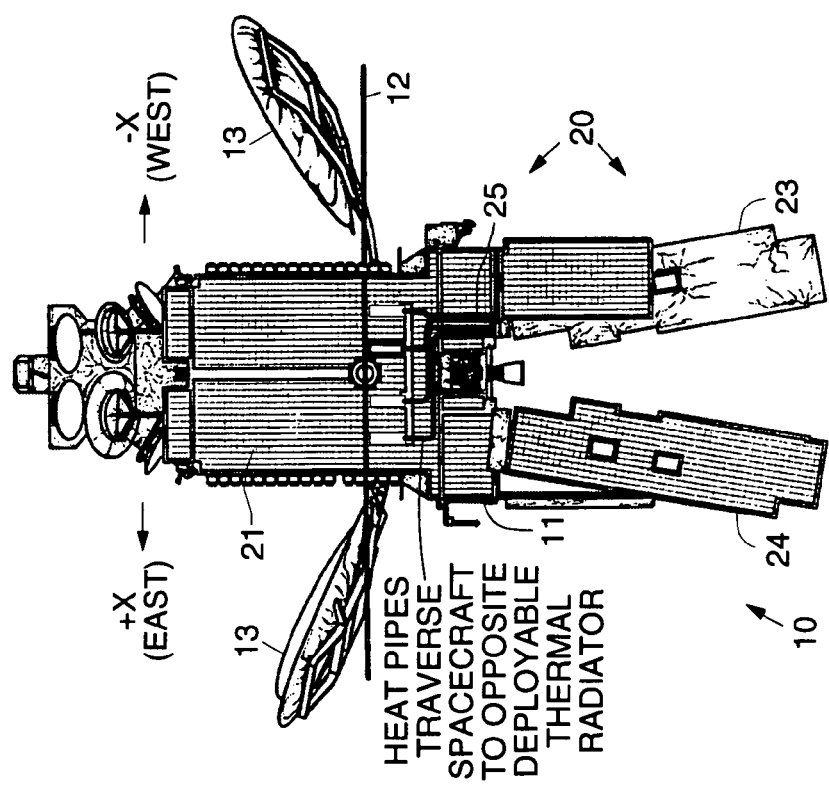

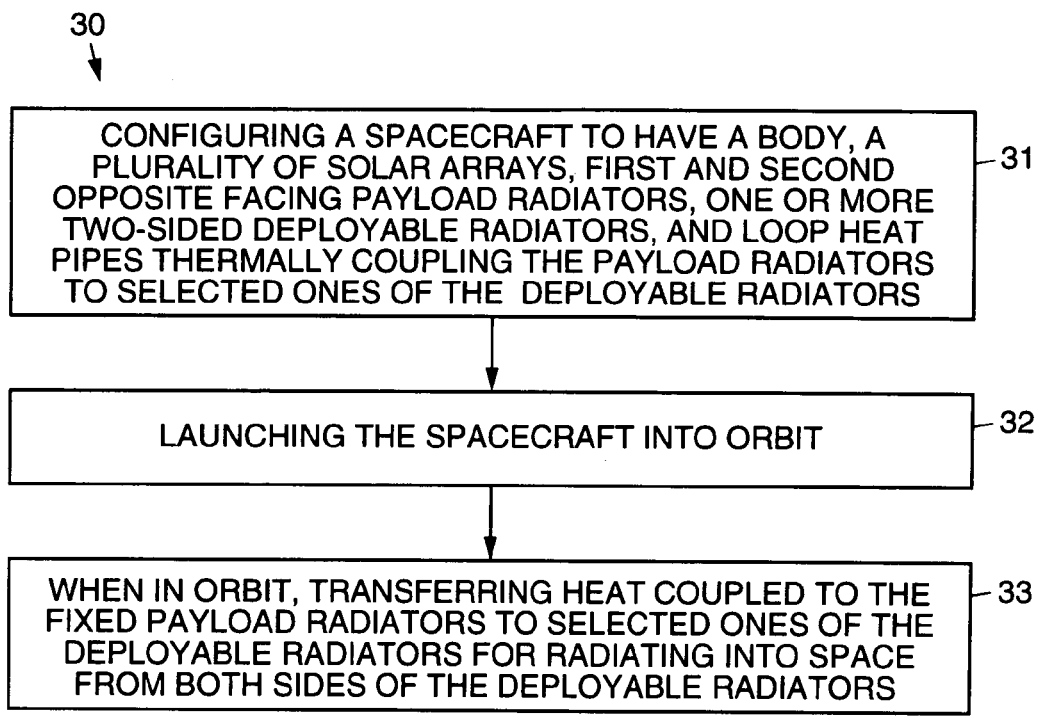

TWO-SIDED DEPLOYABLE THERMAL RADIATOR SYSTEM AND METHOD

BACKGROUND

The present invention relates generally to spacecraft, and more specifically to a two-sided deployable thermal radiator system and method for use on spacecraft.

The assignee of the present invention manufactures and deploys spacecraft into geosynchronous and low earth orbits. Such spacecraft use a radiator system to dissipate heat. The radiator system transfers thermal energy to radiator panels where it is radiated into space.

A deployable radiator used to shield the primary payload radiator in a stowed position to minimize transfer orbit heater power is disclosed by Caplin in U.S. Pat. No. 5,806,800 and Jones in U.S. Pat. No. 5,794,890. Various configurations of deployment radiator mechanisms and schemes are also disclosed by Cullimore in U.S. Pat. No. 5,177,901 and by Drolen in U.S. Pat. No. 5,787,969. However, a two-sided deployable thermal radiator has heretofore not been developed.

Caplin and Jones describe deployable thermal radiators that are used to shield the entire primary payload radiator in the stowed position to eliminate transfer orbit heater power. One side of the deployable radiator is covered with a thermal blanket or shield. This invention exposes both sides of the deployable thermal radiator to space, thereby increasing thermal dissipation capability.

Caplin and Jones disclose shielding one side of the deployable thermal radiators to eliminate transfer orbit heater power. By exposing both sides of the deployable thermal radiator to space, the available radiator area is doubled. The increased thermal rejection capability is approximately 50% over a one sided deployable thermal radiator of the same size.

It is an objective of the present invention to provide for a heat dissipating apparatus comprising a spacecraft radiator system comprising two-sided deployable thermal radiators and spacecraft heat dissipation method.

SUMMARY OF THE INVENTION

To accomplish the above and other objectives, the present invention provides for a spacecraft thermal radiator system that uses two-sided deployable thermal radiators that dissipate heat from both front and back surfaces thereof. The use of the two-sided deployable thermal radiators enables the thermal radiator system to have approximately 50% more capability than a system with just one surface exposed to dissipate heat.

The present invention provides for an improved spacecraft radiator system, spacecraft, and spacecraft heat dissipation method. An exemplary spacecraft radiator system comprises first and second opposite facing fixed payload radiators that are thermally coupled to one or more deployable radiators that radiate heat from both sides thereof by way of heat pipes, such as loop heat pipes, for example. An exemplary spacecraft comprises a body, one or more solar arrays, and a spacecraft radiator system comprising first and second opposite facing fixed payload radiators that are thermally coupled to one or more deployable radiators that radiate heat from both sides thereof.

An exemplary spacecraft heat dissipation method comprises the following steps. A spacecraft is configured to have a body, one or more solar arrays, first and second opposite facing fixed payload radiators, and one or more two-sided deployable radiators selectively coupled to the fixed payload radiators that radiate heat from both sides thereof. The spacecraft is launched into orbit. When in orbit, heat coupled to the opposite facing fixed payload radiators is transferred to the two-sided deployable radiators for radiation into space from both sides thereof.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 2 illustrates a south side view of the spacecraft and exemplary spacecraft thermal radiator system shown in FIG. 1;

FIG. 3 illustrates a west side view of the spacecraft and exemplary spacecraft thermal radiator system shown in FIG. 1; and FIG. 4 is a flow diagram that illustrates an exemplary spacecraft heat dissipation method in accordance with the principles of the present invention.

DETAILED DESCRIPTION

Figure 1:
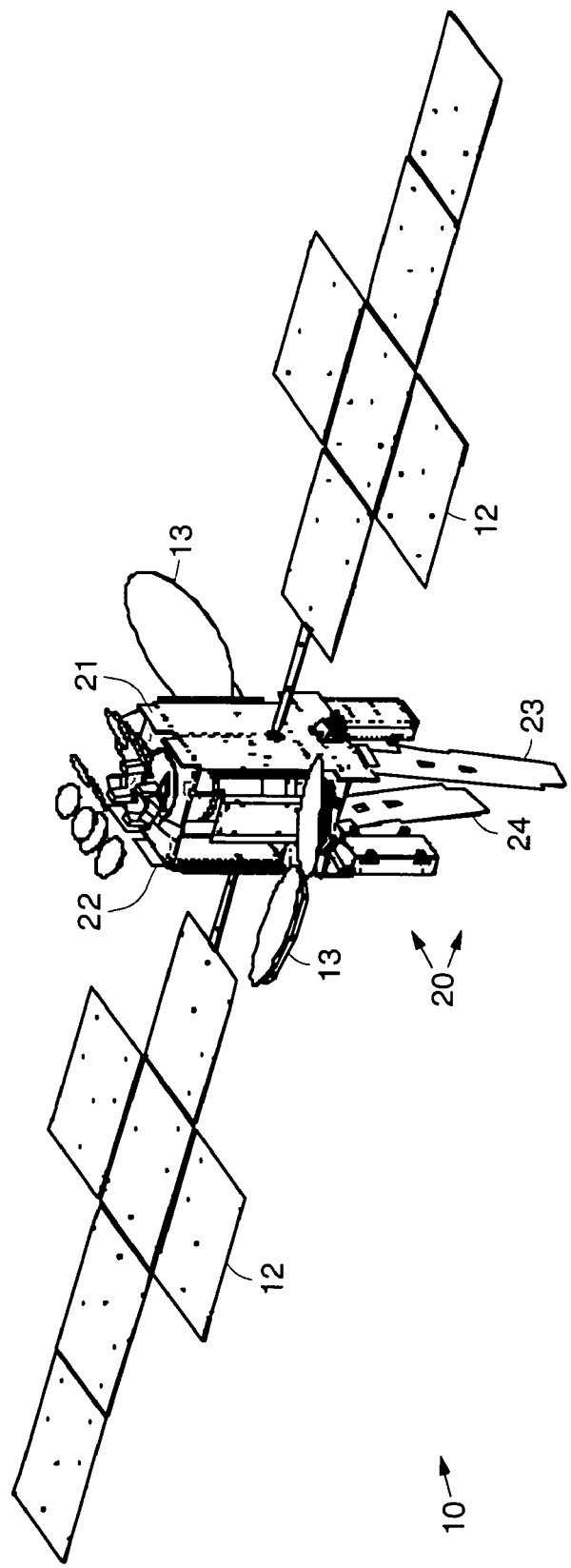
FIG. 1 illustrates a spacecraft employing an exemplary spacecraft thermal radiator system in accordance with the principles of the present invention.

Referring to the drawing figures, FIG. 1 illustrates a spacecraft 10 employing an exemplary spacecraft thermal radiator system 20 in accordance with the principles of the present invention. FIGS. 2 and 3 illustrate south and west side views, respectively, of the spacecraft 10 and exemplary spacecraft thermal radiator system 20 shown in FIG. 1

The spacecraft 10 illustrated in FIG. 1 comprises a body 1 to which one or more solar arrays 12 are coupled. A plurality of antennas 13 are disposed on various faces of the body 1 1. The spacecraft 10 has a plurality of radiators 21–24, which in the exemplary embodiment comprise a north facing fixed payload radiator 21, a south facing fixed payload radiator 22, and a plurality of two-sided deployable radiators 23, 24.

The north facing fixed payload radiator 21 is thermally coupled to one of the two-sided deployable radiators 23, 24 by means of one or more coupling heat pipes 25, which are preferably loop heat pipes 25. Similarly, the south facing fixed payload radiator 22 is thermally coupled to the other of the two-sided deployable radiators 23, 24 by means of one or more coupling or loop heat pipes 25. It is to be understood that the fixed payload radiators 21, 22 may be coupled to either one or both of the two-sided deployable radiators 23, 24.

The one or more coupling or loop heat pipes 25, may extend across an aft deck 14 of the body 11 of the spacecraft 10 to connect or couple the north and south facing fixed payload radiator 21, 22 to the two-sided deployable radiator 23, 24 disposed on the other side of the spacecraft 10, for example. Thus, each fixed payload radiator 21, 22 is coupled to one or more of the two-sided deployable radiators 23, 24.

In accordance with the present invention, the two-sided deployable radiator 23, 24 dissipate heat generated on the spacecraft 10 and radiate the heat into space from both exposed sides thereof. By thermally coupling the north and south facing radiators 21, 22 to the two-sided deployable radiators 23, 24 using the teachings of the present invention, the amount of solar load processed by the radiator system 20 is minimized. This coupling of the radiators 21–24 increases the thermal dissipation capability of the radiator system 20 by approximately 50% compared to a system having deployable radiators having just one surface exposed to dissipate heat.

FIG. 4 is a flow diagram that illustrates an exemplary spacecraft heat dissipation method 30 in accordance with the principles of the present invention. The exemplary spacecraft heat dissipation method 30 comprises the following steps.

A spacecraft 10 is configured 31 to have a body 11 one or more solar arrays 12, first and second opposite facing fixed payload radiators 21, 22, one or more two-sided deployable radiators 23, 24, and coupling or loop heat pipes 25 that thermally couple the fixed payload radiators 21, 22 to one or more of the two-sided deployable radiators 23, 24. The spacecraft 10 is launched 32 into orbit. In orbit, heat coupled to the respective fixed payload radiators 21, 22 is transferred 33 to one or more of the two sided deployable radiators 23, 24.

Thus, a spacecraft radiator system comprising a two-sided deployable thermal radiators and spacecraft heat dissipation method have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A spacecraft radiator system for use on a spacecraft having a body and one or more solar arrays, the system comprising:

first and second opposite facing payload radiators;

one or more deployable radiators that radiate heat from both sides thereof; and heat pipes that thermally couple each payload radiator to the one or more deployable radiators disposed on a side of the spacecraft that is opposite to the respective payload radiator.

2. A spacecraft comprising:

a body;

one or more solar arrays; and a spacecraft radiator system comprising:

first and second opposite facing payload radiators;

one or more deployable radiators that radiate heat from both sides thereof; and heat pipes that thermally couple the respective payload radiators to the one or more deployable radiators disposed on a side of the spacecraft that is opposite to the respective payload radiator.

3. A spacecraft heat dissipation method comprising the steps of:

configuring a spacecraft to have a body, one or more solar arrays, first and second opposite facing fixed payload radiators, one or more deployable radiators that radiate heat from both sides thereof, and heat pipes that thermally couple the respective payload radiators to the one or more deployable radiators disposed on a side of the spacecraft that is opposite to the respective payload radiator;

launching the spacecraft into orbit; and when in orbit, transferring heat coupled to the opposite facing fixed payload radiators to the deployable radiators disposed on the opposite side of the spacecraft for radiation into space from both sides to the deployable radiators.

* * * * *